(12) United States Patent
Sangwan et al.

(10) Patent No.: US 6,691,523 B1
(45) Date of Patent: Feb. 17, 2004

(54) AIR CONDITIONING CAPACITY CONTROL METHOD FOR REDUCING MOTOR VEHICLE ENGINE EXHAUST EMISSIONS

(75) Inventors: Karma Vir Sangwan, East Amherst, NY (US); Charles Andrew Archibald, Lockport, NY (US); Ronald Joseph Goubeaux, Lockport, NY (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 10/279,324

(22) Filed: Oct. 24, 2002

(51) Int. Cl.[7] ................................................. B60H 1/32
(52) U.S. Cl. ....................................... 62/133; 62/228.5
(58) Field of Search ...................... 62/133, 126, 228.1, 62/228.4, 228.5, 243, 229, 230, 323.1, 323.4, 158

(56) References Cited

U.S. PATENT DOCUMENTS

| | | | | |
|---|---|---|---|---|
| 4,606,197 A | * | 8/1986 | Takahashi et al. | 62/133 |
| 4,796,438 A | * | 1/1989 | Sato | 62/133 |
| 4,864,832 A | * | 9/1989 | Suzuki | 62/133 |
| 5,022,232 A | * | 6/1991 | Sakamoto et al. | 62/133 |
| 5,893,272 A | * | 4/1999 | Hanselmann et al. | 62/133 |
| 6,546,742 B1 | * | 4/2003 | Ota et al. | 62/133 |

* cited by examiner

Primary Examiner—Harry B. Tanner
(74) Attorney, Agent, or Firm—Patrick M. Griffin

(57) ABSTRACT

An improved compressor capacity control method selectively overrides a normal capacity control during periods of vehicle acceleration to reduce engine exhaust emissions. The capacity override is invoked when the rate of engine throttle movement exceeds a predefined rate, provided that the load imposed by the compressor is sufficiently high and the vehicle speed is greater than a minimum value. Once invoked, the override reduces the compressor capacity to a predetermined level, and measures the elapsed time. The override is maintained for at least a minimum time period that ensures an emission benefit, after which the vehicle speed is monitored to determine the extent of the acceleration. The override is terminated when the rate of increase in vehicle speed falls below a reference rate, or when the elapsed time exceeds a reference time, whichever occurs first.

5 Claims, 2 Drawing Sheets

AIR CONDITIONING CAPACITY CONTROL METHOD FOR REDUCING MOTOR VEHICLE ENGINE EXHAUST EMISSIONS

TECHNICAL FIELD

The present invention is directed to a motor vehicle air conditioning system including a variable capacity refrigerant compressor driven by the vehicle engine, and more particularly to a control method for overriding the normal capacity control for the purpose of reducing engine exhaust emissions.

BACKGROUND OF THE INVENTION

It has been shown that in a motor vehicle equipped with an engine-driven air conditioning compressor, normal operation of the compressor can significantly increase the engine exhaust emissions (particularly carbon-monoxide and oxides of nitrogen) during periods of vehicle acceleration. While it would be possible to simply de-couple the compressor from the engine during vehicle acceleration, as is commonly done during wide-open throttle engine operation, the occupant comfort would be significantly and unnecessarily degraded under many conditions. Accordingly, what is needed is a method of controlling the load imposed by an engine-driven compressor so as to reduce engine exhaust emissions without unnecessarily degrading occupant comfort.

SUMMARY OF THE INVENTION

The present invention is directed to an improved method of operation for an engine-driven air conditioning compressor, wherein the normal capacity control of a variable capacity air conditioning compressor is selectively overridden during periods of vehicle acceleration to effectively reduce engine exhaust emissions. According to the invention, the capacity override is invoked when the rate of engine throttle movement exceeds a predefined rate, provided that the load imposed by the compressor is sufficiently high and the vehicle speed is greater than a minimum value. Once invoked, the override reduces the compressor capacity to a predetermined level, and measures the elapsed time. The override is maintained for at least a minimum time period that ensures an emission benefit, after which the vehicle speed is monitored to determine the extent of the acceleration. The override is terminated when the rate of increase in vehicle speed falls below a reference rate, or when the elapsed time exceeds a reference time, whichever occurs first.

DESCRIPTION OF THE PREFERRED EMBODIMENT

Figure 1:
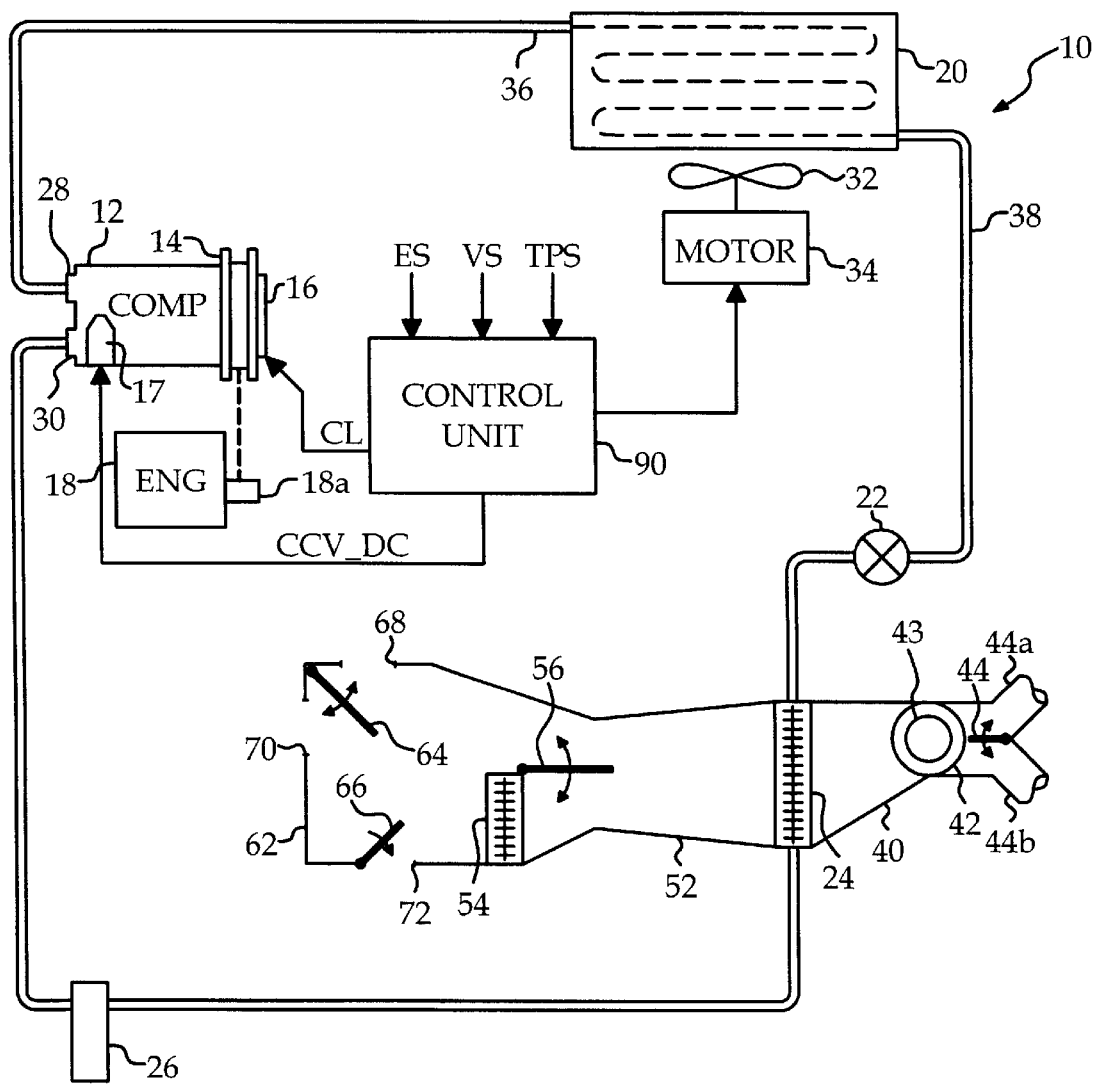
FIG. 1 is a diagram of a motor vehicle air conditioning system according to this invention, including an engine-driven variable capacity refrigerant compressor and a microprocessor-based control unit.

Referring to FIG. 1, the reference numeral 10 generally designates a vehicle air conditioning system, including a variable capacity refrigerant compressor 12 coupled to a drive pulley 14 via an electrically activated clutch 16. The pulley 14 is coupled to a rotary shaft 18a of the vehicle engine 18 as schematically depicted in FIG. 1, and the clutch 16 is selectively engaged or disengaged to turn the compressor 12 on or off, respectively. The compressor capacity control is effectuated by an electrically activated capacity control valve 17 mounted in the rear head of compressor 12. In the illustrated embodiment, the compressor 12 has an internal bleed passage coupling its crankcase to the suction port 30, and the capacity control valve 17 selectively opens and closes a passage between the crankcase and the discharge port 28 to control the crankcase pressure, and therefore, the compressor pumping capacity. Raising the pressure in the crankcase decreases the compressor capacity, while lowering the pressure in the crankcase increases the compressor capacity. If desired, the capacity control valve 17 may also include integral suction and discharge pressure sensors and signal conditioning circuitry, eliminating the need for discrete external sensors.

In addition to the compressor 12, the system 10 includes a condenser 20, an orifice tube 22, an evaporator 24, and an accumulator/dehydrator 26 arranged in order between the compressor discharge port 28 and suction port 30. A cooling fan 32, operated by an electric drive motor 34, is controlled to provide supplemental air flow through the condenser 20 for removing heat from condenser 20. The orifice tube 22 allows the cooled high pressure refrigerant in line 38 to expand in an isenthalpic process before passing through the evaporator 24. The accumulator/dehydrator 26 separates low pressure gaseous and liquid refrigerant, directs a gaseous portion to the compressor suction port 30, and acts as a reservoir for the reserve refrigerant charge. In an alternative system configuration, the orifice tube 22 is replaced with a thermostatic expansion valve (TXV); in this case, the accumulator/dehydrator 26 is omitted, and a receiver/drier (R/D) is inserted in line 38 upstream of the TXV to ensure that sub-cooled liquid refrigerant is supplied to the inlet of the TXV.

The evaporator 24 is formed as an array of finned refrigerant conducting tubes, and an air intake duct 40 disposed on one side of evaporator 24 houses an inlet air blower 42 driven by an electric blower motor 43 to force air past the evaporator tubes. The duct 40 is bifurcated upstream of the blower 42, and an inlet air control door 44 is adjustable as shown to control inlet air mixing; depending on the door position, outside air may enter blower 42 through duct leg 44a, and passenger compartment air may enter blower 42 through duct leg 44b.

An air outlet duct 52 disposed on the downstream side of blower 42 and evaporator 24 houses a heater core 54 formed as an array of finned tubes that conduct engine coolant. A temperature control door 56 near the heater core 54 is adjustable as shown to control what proportion of air exiting evaporator 24 must pass through the heater core 54. The heated and un-heated air portions are mixed in a plenum portion 62 of outlet duct 52 downstream of heater core 54 and temperature control door 56, and a pair of mode control doors 64, 66 are adjustable as shown to direct the mixed air through one or more outlets, including a defrost outlet 68, a panel outlet 70, and a heater outlet 72.

The system 10 additionally includes a microprocessor-based control unit 90 for regulating the operation of compressor clutch 16, capacity control valve 17, blower motor 43, condenser fan motor 34, and air control doors 44, 56, 64, 66, although the output signals and actuators for the fan motor 43 and air control doors 44, 56, 64, 66 have been omitted for simplicity. When air conditioning is enabled, the control unit 90 engages the compressor clutch 16 and activates the capacity control valve 17 to achieve a desired pumping capacity. In the illustrated embodiment, the control unit 90 pulse-width-modulates (PWM) the capacity control valve 17 at a variable duty cycle CCV_DC to control compressor capacity by variably restricting a passage between the compressor crankcase and the discharge port 28. Increasing the duty cycle reduces the restriction, which has the effect of increasing the crankcase pressure and reducing the compressor capacity. On the other hand, decreasing the duty cycle operates to increase the restriction for increasing the compressor capacity. Of course, the capacity control valve 17 could be configured oppositely if desired. Ordinarily, control unit 90 activates the control valve 17 as required to maintain the refrigerant suction pressure (or the evaporator outlet air temperature) at a predetermined set point that provides maximum cooling without evaporator icing. Under light air conditioning load, the set point is easily achieved, and the compressor capacity and the load it presents to the engine 18 will be relatively low. However, under heavy air conditioning load, full compressor capacity may be required to achieve the set point, resulting in much higher engine loading. Accordingly, the duty cycle CCV_DC is a reasonably accurate indicator of the mechanical load imposed by the compressor 12.

The present invention is directed to a method of overriding the normal control of capacity control valve 17 for the purpose of improving both engine exhaust emissions and vehicle acceleration. The method, which is preferably carried out by way of a software routine executed by the control unit 90, initiates a compressor capacity override when the rate of engine throttle movement exceeds a predefined rate, provided that the load currently imposed by compressor 12 is sufficiently high and the vehicle speed is greater than a minimum value. Once invoked, the override reduces the compressor capacity to a predetermined level, and measures the elapsed time. The override is maintained for at least a minimum time period that ensures an emission benefit, after which the vehicle speed is monitored to determine the extent of the acceleration. The override is terminated when the rate of increase in vehicle speed falls below a reference rate, or when the elapsed time exceeds a maximum reference time, whichever occurs first. Accordingly, the control unit 90 has access to engine speed ES, vehicle speed VS and engine throttle position TPS, as indicated in FIG. 1; these parameters may be measured by dedicated sensors, or communicated to control unit 90 over a vehicle data bus.

Figure 2:
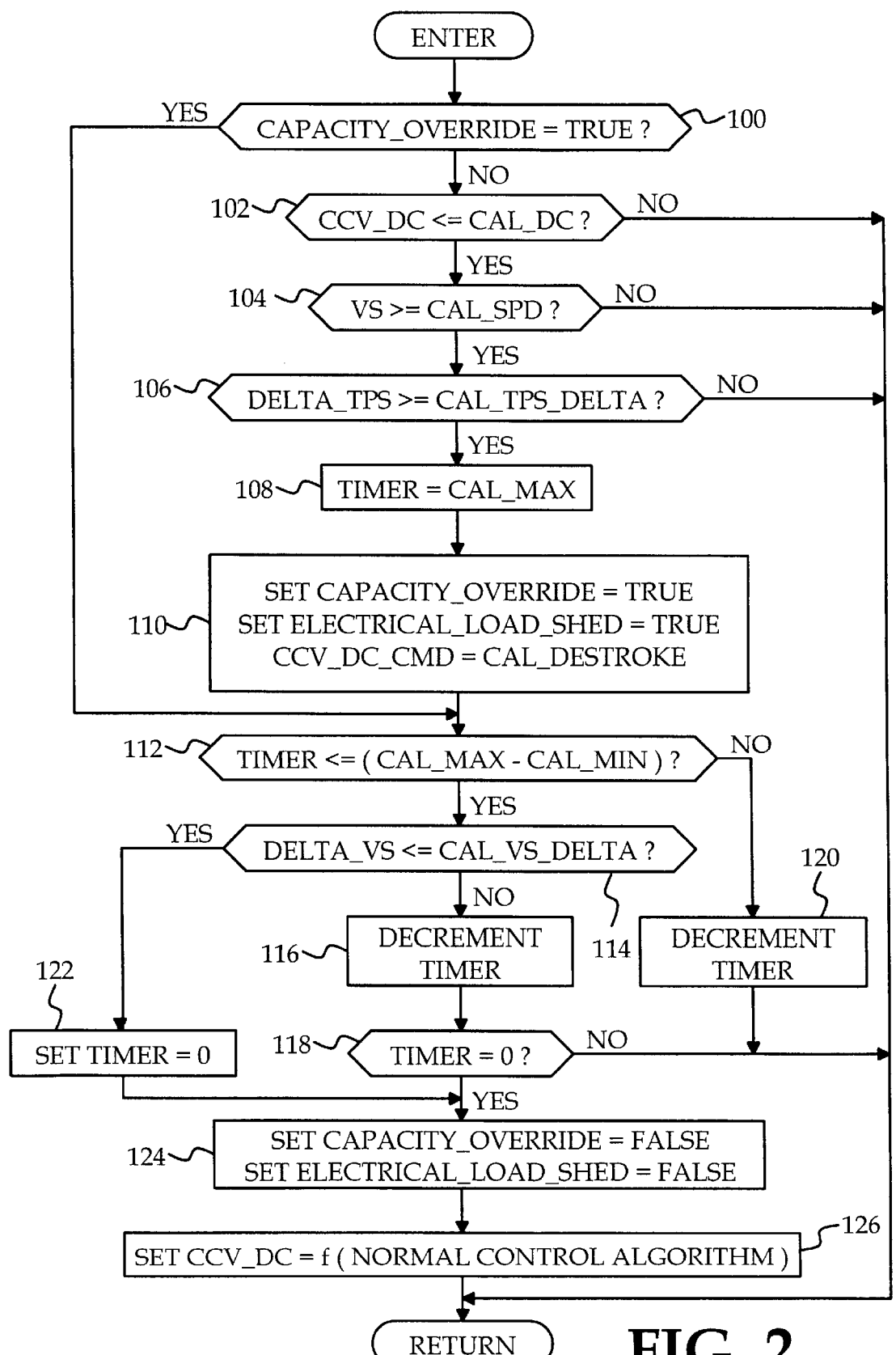
FIG. 2 is a flow diagram of a software routine executed by the control unit of FIG. 1 for carrying out the control method of this invention.

FIG. 2 depicts a flow diagram of a periodically executed software routine for carrying out the above-described capacity control. Referring to FIG. 2, the block 100 first determines if the compressor capacity override is currently in effect, as indicated by the status of the CAPACITY_OVERRIDE flag. Initially, the state of the flag will be FALSE, and the blocks 102, 104 and 106 are executed to determine if a capacity override should be invoked. The block 102 compares CCV_DC to a reference duty cycle CAL_DC (such as 20%, for example), and is answered in the affirmative if the load imposed by compressor 12 is sufficiently high to negatively impact engine exhaust emissions. The block 104 compares vehicle speed VS to a reference speed CAL_SPD (such as 2–3 MPH, for example), and the block 106 compares the change in engine throttle position DELTA_TPS to a reference change CAL_TPS_DELTA indicative of a moderate to heavy period of vehicle acceleration. If the blocks 102, 104 and 106 are answered in the affirmative, the block 108 sets a timer to a maximum override duration CAL_MAX, and the block 110 invokes the override by setting the CAPACITY_OVERRIDE flag to TRUE, setting an ELECTRICAL_LOAD_SHED flag to TRUE, and setting CCV_DC to a calibrated value CAL_DESTROKE (such as 95%, for example) that will reduce the compressor capacity to a minimum level. Setting the CAPACITY_OVERRIDE flag to TRUE will cause the block 100 to be answered in the affirmative in a subsequent execution of the routine, and the blocks 102–110 will be skipped as indicated. When the ELECTRICAL_LOAD_SHED flag is TRUE, various non-essential electrical loads may be reduced or turned off to reduce the load on an engine-driven generator or alternator; in the case of air conditioning system 10, the speed of blower motor 43 may be reduced, for example.

Once the capacity override is initiated, the control unit 90 executes the blocks 112–118 to determine when the override should be terminated. The block 112 compares the timer to the difference (CAL_MAX_CAL_MIN), where CAL_MAX is the maximum override duration (such as 10 seconds, for example), and CAL_MIN is a minimum override duration (such as 3 seconds, for example). The block 114 compares the rate of increase in vehicle speed DELTA_VS to a calibrated value CAL_VS_DELTA indicative of a return to substantially constant speed, the block 116 decrements the timer, and the block 118 determines if the timer has been decremented to zero. Initially, block 112 will be answered in the negative, and the block 120 is executed to decrement the timer, completing the routine. After the override has been in effect for at least CAL_MIN seconds, the block 114 will be executed to determine if DELTA_VS is below CAL_VS_DELTA. If block 114 is answered in the affirmative, the block 122 sets the timer to zero and the blocks 124 and 126 terminate the override by setting the CAPACITY_OVERRIDE and ELECTRICAL_LOAD_SHED flags to FALSE, and setting CCV_DC to a value determined by the normal capacity control algorithm. If DELTA_VS stays above CL_VS_DELTA, the block 116 periodically decrements the timer, and the blocks 118, 124 and 126 terminate the override when the maximum time interval CAL_MAX has elapsed.

In summary, the method of the present invention provides a simple but effective way of reducing the load imposed on an engine by an air conditioning system in a way that significantly reduces engine exhaust emissions without unnecessarily degrading occupant comfort. Initial testing of the method in a production vehicle showed that the engine exhaust emissions during vehicle acceleration were reduced substantially to the level achieved with air conditioning completely disabled. While described in reference to the illustrated embodiment, it will be understood that various modifications in addition to those mentioned above will occur to those skilled in the art. For example, the described control method is also applicable to so-called clutch-less system in which the compressor 12 is continuously coupled to the engine 18, and to systems incorporating a different type of compressor and/or a different normal capacity control strategy than described herein. Also, the compressor capacity may be determined by a sensor (such as a stroke sensor, for example), or by computing its work or power (based on its inlet and outlet pressures and its driven speed, for example). Accordingly, it will be understood that control methods incorporating these and other modifications may fall within the scope of the present invention, which is defined by the appended claims.

What is claimed is:

1. A method of operation for an air conditioning system of a motor vehicle, including an electrical load and a refrigerant compressor driven by a vehicle engine and having a pumping capacity that is controlled by an electrically activated capacity control valve, the method comprising the steps of:

- detecting a condition of high compressor pumping capacity;
- detecting a period of acceleration of the vehicle;
- overriding a normal activation level of said capacity control valve to reduce the compressor pumping capacity to a minimum value when the period of acceleration is initially detected, provided that said condition of high compressor pumping capacity is also detected;
- maintaining said override for at least a predefined minimum time; and
- overriding the electrical load while the normal activation level of said capacity control valve is being overridden so as to reduce a load imposed on the engine by such electrical load.

2. A method of operation for an air conditioning system of a motor vehicle, including a refrigerant compressor driven by a vehicle engine and having a pumping capacity that is controlled by an electrically activated capacity control valve, the method comprising the steps of:

- detecting a condition of high compressor pumping capacity;
- detecting a period of acceleration of the vehicle;
- overriding a normal activation level of said capacity control valve to reduce the compressor pumping capacity to a minimum value when the period of acceleration is initially detected, provided that said condition of high compressor pumping capacity is also detected and a speed of the vehicle is at least as high as a reference speed; and
- maintaining said override for at least a predefined minimum time.

3. A method of operation for an air conditioning system of a motor vehicle, including a refrigerant compressor driven by a vehicle engine and having a pumping capacity that is controlled by an electrically activated capacity control valve, the method comprising the steps of:

- detecting a condition of high compressor pumping capacity;
- detecting a period of acceleration of the vehicle;
- overriding a normal activation level of said capacity control valve to reduce the compressor pumping capacity to a minimum value when the period of acceleration is initially detected, provided that said condition of high compressor pumping capacity is also detected;
- maintaining said override for at least a predefined minimum time;
- measuring an elapsed time of said override; and
- terminating said override when the elapsed time reaches said predefined minimum time if a rate of increase in vehicle speed is less than a reference rate.

4. A method of operation for an air conditioning system of a motor vehicle, including a refrigerant compressor driven by a vehicle engine and having a pumping capacity that is controlled by an electrically activated capacity control valve, the method comprising the steps of:

- detecting a condition of high compressor pumping capacity;
- detecting a period of acceleration of the vehicle;
- overriding a normal activation level of said capacity control valve to reduce the compressor pumping capacity to a minimum value when the period of acceleration is initially detected, provided that said condition of high compressor pumping capacity is also detected;
- maintaining said override for at least a predefined minimum time;
- measuring an elapsed time of said override;
- periodically determining a rate of increase in vehicle speed; and
- after the elapsed time reaches said predefined minimum time, terminating said override when the determined rate of increase in vehicle speed is less than a reference rate.

5. The method of claim 4, including the step of:

- terminating said override if the elapsed time reaches a predefined maximum time even though the determined rate of increase in vehicle speed exceeds said reference rate.

* * * * *